United States Patent
Mirarchi et al.

(10) Patent No.: US 9,591,093 B2
(45) Date of Patent: Mar. 7, 2017

(54) METHOD AND APPARATUS FOR CACHED CONTENT DELIVERY TO ROAMING DEVICES

(71) Applicant: Telefonaktiebolaget L M Ericsson (publ), Stockholm (SE)

(72) Inventors: Alberto Mirarchi, Montreal (CA); Edoardo Gavita, Laval (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 746 days.

(21) Appl. No.: 13/907,456

(22) Filed: May 31, 2013

(65) Prior Publication Data

US 2014/0359045 A1  Dec. 4, 2014

(51) Int. Cl.
G06F 15/173 (2006.01)
H04L 29/08 (2006.01)
H04W 4/18 (2009.01)

(52) U.S. Cl.
CPC ...... *H04L 67/2842* (2013.01); *H04L 67/2847* (2013.01); *H04W 4/18* (2013.01); *H04L 67/18* (2013.01); *H04L 67/288* (2013.01)

(58) Field of Classification Search
USPC .................................................. 709/213, 220
See application file for complete search history.

(56) References Cited

U.S. PATENT DOCUMENTS

| 8,244,874 B1 | 8/2012 | Thireault | |
|---|---|---|---|
| 2005/0186940 A1* | 8/2005 | Schatzberger | H04L 67/22 455/406 |
| 2005/0188078 A1* | 8/2005 | Kotzin | H04N 7/163 709/224 |
| 2005/0188403 A1* | 8/2005 | Kotzin | G06F 17/30056 725/47 |
| 2005/0188406 A1* | 8/2005 | Gielow | H04L 29/06027 725/81 |
| 2007/0173237 A1* | 7/2007 | Roundtree | H04W 4/18 455/414.1 |

(Continued)

FOREIGN PATENT DOCUMENTS

| EP | 1675027 A1 | 6/2006 |
|---|---|---|
| WO | 2008072093 A2 | 6/2008 |

OTHER PUBLICATIONS

Author Unknown, Velocix Content Delivery Network, Alcatel-Lucent Brochure, 2013, pp. 1-20.

(Continued)

*Primary Examiner* — Tammy Nguyen
(74) *Attorney, Agent, or Firm* — Murphy, Bilak & Homiller, PLLC

(57) ABSTRACT

In one aspect, the method and apparatus disclosed herein enable a high-quality content viewing experience for users viewing user-specific content via their mobile devices operating within a mobile communication network, based on intelligently caching the content in the network using one or more distributed caches. For example, in one or more embodiments, a cache management server dynamically manages the distribution of user-specific content to one or more of the distributed caches, based on known or expected user locations, so that the content resides in the distributed cache or caches closest to the user locations.

20 Claims, 4 Drawing Sheets

(56) References Cited

U.S. PATENT DOCUMENTS

| | | | |
|---|---|---|---|
| 2008/0195824 A1* | 8/2008 | Sadovsky | G06F 21/62 |
| | | | 711/158 |
| 2010/0217824 A1 | 8/2010 | Stiemerling et al. | |
| 2011/0131290 A1 | 6/2011 | Kim et al. | |
| 2012/0289147 A1 | 11/2012 | Raleigh et al. | |
| 2013/0031191 A1* | 1/2013 | Bott | G06F 21/552 |
| | | | 709/206 |
| 2013/0054729 A1 | 2/2013 | Jaiswal et al. | |
| 2013/0163431 A1* | 6/2013 | Backholm | H04W 28/0273 |
| | | | 370/235 |
| 2014/0233384 A1* | 8/2014 | Howard | H04W 28/0289 |
| | | | 370/235 |
| 2014/0359045 A1* | 12/2014 | Mirarchi | H04L 67/2842 |
| | | | 709/213 |

OTHER PUBLICATIONS

Xiang, Zhe et al., "MobileCache: an Efficient Proxy Cache Mechanism for Cell-based Wireless Multimedia Streaming", Visual Communications and Image Processing, Proceedings of SPIE vol. 4671, San Jose, California, US, Jan. 21, 2002, 221-229.

\* cited by examiner

METHOD AND APPARATUS FOR CACHED CONTENT DELIVERY TO ROAMING DEVICES

TECHNICAL FIELD

The present invention generally relates to communication networks, and particularly relates to caching user-specific content for delivery to devices roaming in such networks.

BACKGROUND

Standardization by the Third Generation Partnership Project (3GPP) encompasses radio access network, core network and service architectures. Release 8 of the 3GPP standards introduced so called fourth generation (4G) technology, referred to as Long Term Evolution or LTE. LTE uses Orthogonal Frequency Division Multiplexing (OFDM) and supports significantly higher data rates than seen in previous generations of wireless communication networks.

Subsequent releases, e.g., Releases 10 and 11 have refined and extended LTE, and LTE networks with higher data throughput are being rolled out across the globe, allowing mobility while maintaining acceptable Quality of Service (QoS) for multimedia applications, such as video. LTE and other higher-bandwidth technologies, such as High Speed Packet Access (HSPA) services within Wideband Code Division Multiple Access (WCDMA) networks, Wi-Fi networks, etc., provide both macro and micro (hotspot) coverage. In this regard, macro coverage generally refers to the larger service areas/cells associated with cellular networks spanning relatively broad geographic regions, while hotspots refer to localized service areas, e.g., within a building, stadium, etc. Hotspots may be public or private and may or may not be integrated with macro coverage.

The advent of higher-bandwidth wireless communication networks, also referred to as mobile communication networks, increases the range of services deliverable to end users through their various connected devices. Mobile communication networks in that regard simply represent one more mechanism for delivering content to users or subscribers and people often subscribe to multiple types of networks. For example, users commonly obtain content using so called "content delivery networks," like cable television systems, which are increasingly IP-based and offer a range of content delivery options.

Personal Video Recorders or PVRs represent one such option and PVRs play an increasingly important role in the context of content delivery networks. A PVR, also broadly known as a "DVR" or digital video recorder, allows the affiliated user to record television shows, movies and other types of content and then view the recorded content later. In this context and elsewhere herein, the term "content" should be understood as electronic content and more typically as digital content and may include Digital Rights Management (DRM) or other ancillary or supporting data. In typical usage, the content recorded on a PVR is viewed within the local network to which the PVR is connected. Typically, the content is viewed on a television connected to the PVR, either directly or through a set top box (STB) connected to the PVR using the local network.

PVRs include or otherwise operate as a local cache, which may comprise a hard drive and associated processing circuitry, to save and playback cached content and PVRs generally provide some type of user interface for content browsing, management, and overall PVR control. Some PVRs permit remote access via broadband IP connections, but such approaches are not well suited to the delivery of user-specific content via mobile communication networks at consistently high QoS levels.

SUMMARY

In one aspect, the method and apparatus disclosed herein enables a high-quality content viewing experience for users viewing user-specific content via their mobile devices operating within a mobile communication network, based on intelligently caching the content in the network using in one or more distributed caches. For example, in one or more embodiments, a cache management server dynamically manages the distribution of user-specific content to one or more of the distributed caches, based on known or expected user locations, so that the content resides in the distributed cache or caches closest to the user locations.

In one example, a method of caching content in a mobile communication network uses distributed caches corresponding to different service areas within the mobile communication network, to cache user-specific content for delivery to a user device via the mobile communication network. The method includes identifying a first distributed cache for a first service area in the mobile communication network that corresponds to a location detected or expected for the user device, and determining the content for caching in the first distributed cache, based on content caching at a user-specific cache belonging to a content delivery network affiliated with a user of the user device.

Still further, the method includes initiating caching of the content in the first distributed cache, for delivery to the user device via the mobile communication network. The initiating step is performed at least when the content is not already available in the first distributed cache for delivery to the user device. However, the step may be performed unconditionally, such as when there is little content to push to the distributed cache and/or when there are no bandwidth concerns associated with pushing the content to the distributed cache.

The method in one or more embodiments further includes initiating delivery to the user device of at least a user-requested portion of the content from the first distributed cache. In the same or another embodiment, method includes dynamically initiating caching of the content in one or more other distributed caches within the mobile network, e.g., in response to changes in the detected or expected location of the user device within the mobile communication network. Such operations "move" the user-specific content around within the network, as needed, so that user-specific content is delivered to a given user device using the distributed cache that is closest to the user device.

The above method and variations of it can be carried out in an appropriately configured cache management server within the mobile communication network, or communicatively linked to the network. In one example contemplated herein, a cache management server is configured for caching content for delivery to a user device via a mobile communication network having distributed caches corresponding to different service areas (48) within the mobile communication network. The cache management server includes a communication interface and a processor circuit operatively associated with the communication interface.

Of course, the cache management server may include additional physical and/or functional elements or units, such as one or more storage elements like memory and/or disk storage. In any case, the communication interface is configured to communicate with the distributed caches and further may be configured to communicate with user-specific caches associated with a content delivery network, or to communicate with a server or other management entity within the content delivery network having knowledge of the contents within the user-specific caches.

In turn, for a given user device, the processor circuit is configured to identify a first distributed cache for a first service area within the mobile communication network that corresponds to a location detected or expected for the user device, and determine the content for caching in one or more of the distributed caches, based on content caching at a user-specific cache belonging to a content delivery network affiliated with a user of the user device. The processor circuit is further configured to initiate caching of the content in the first distributed cache for delivery to the user device via the mobile communication network, at least when the content is not available in the first distributed cache, for delivery to the user device.

The processor circuit in one or more embodiments is further configured to initiate delivery to the user device of at least a user-requested portion of the content from the first distributed cache. In the same or another embodiment, the processor circuit is configured to dynamically initiate caching of the content in one or more other distributed caches within the mobile network, e.g., in response to changes in the detected or expected location of the user device within the mobile communication network.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
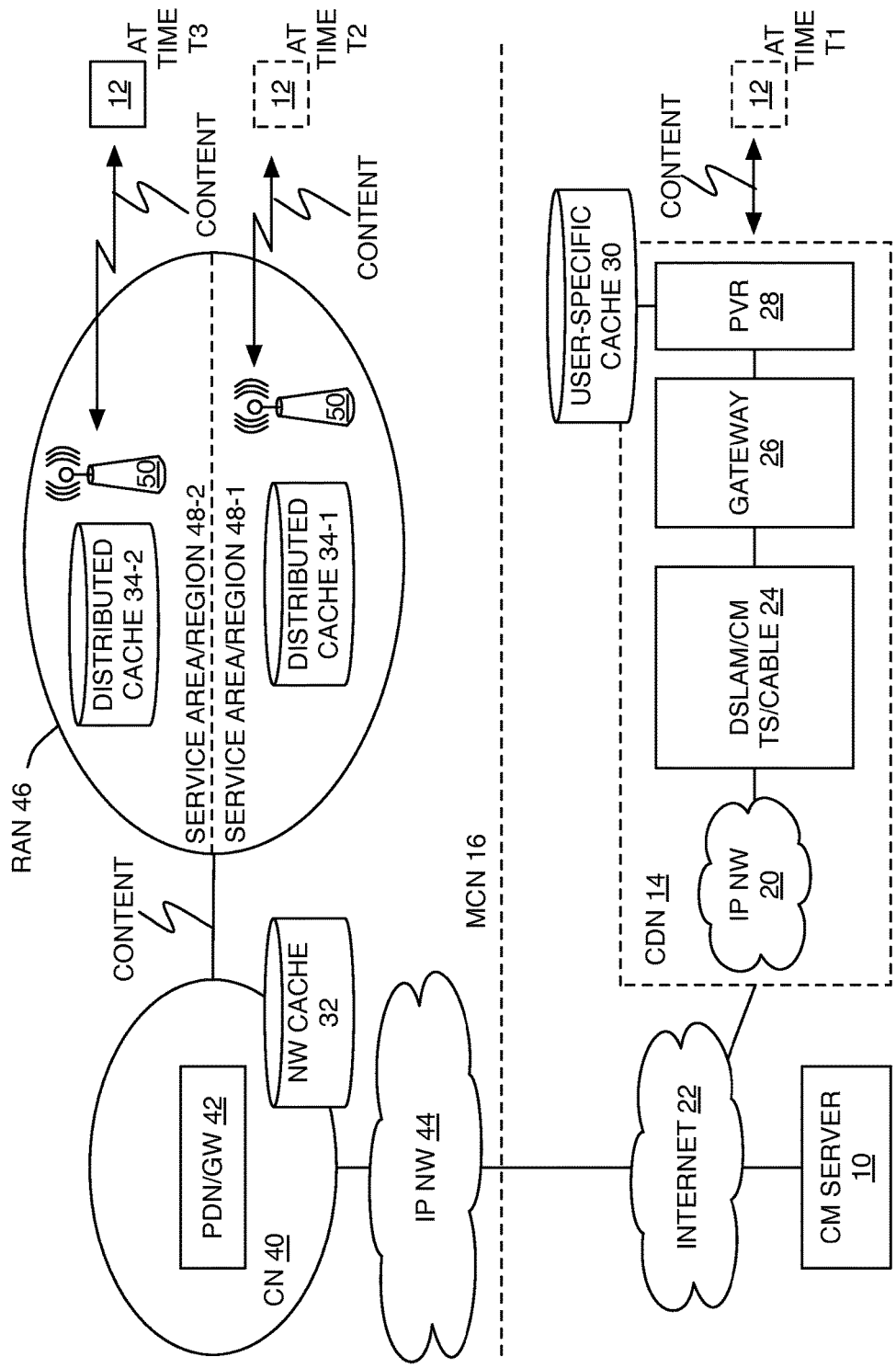
FIG. 1 is a block diagram of one embodiment of a mobile communication network that includes or is associated with a cache management server that is configured according to the teachings herein.

As a non-limiting example, FIG. 1 illustrates a cache management server 10 that is configured to provide cache management services and functions with respect to a user device 12, where those services and function involve interaction with a content delivery network (CDN) 14 and a mobile communication network (MCN) 16. In an example case, the user device 12 is owned or otherwise affiliated with a user having subscriptions with the CDN 14 and the MCN 16, and the user device 12 is, for example, a smartphone or other wireless device having multimedia capabilities and one or more cellular or other wireless interfaces for sending and receiving data or other signaling.

In the illustrated example, the CDN 14 includes an Internet Protocol (IP) network 20 coupling the CDN 14 to the Internet 22 and/or to other packet data networks. The CDN 14 further includes a DSLAM/CMTS/Cable arrangement 24, a gateway 26 and a PVR 28 that creates, maintains or otherwise controls a user-specific cache 30. In this example context, the CDN 14 is a cable network, and DSLAM denotes "Digital Subscriber Line Access Multiplexer," and CMTS denotes "Cable Modem Termination System." Further, the cache 30 may be understood as being a "user-specific" cache in the sense that it captures and stores television shows, movies, music, or other such content according to the preferences and activities of the user associated with the illustrated user device 12. As such, the user-specific cache may be physically located in the residence of the user, at the user's office, etc., and there may be one or more audio/visual (A/V) systems coupled to the PVR 28, which are not shown in the diagram.

The MCN 16 includes a network cache 32 and a number of distributed caches 34. The network cache 32 may be in or communicatively coupled with the core network (CN) 40 of the MCN 16. The CN 40 includes a number of CN entities, such as a Packet Data Network Gateway (PDN/GW) 42, and is communicatively coupled to the Internet 22 and/or other packet data networks via an IP network 44.

The MCN 16 further includes a Radio Access Network (RAN) 46, which provides communication services over a number of service areas or regions 48. One or more base stations 50 or other radio network nodes provide communication services within each service area 50. It should be understood that for purposes of this discussion, the depicted service areas 48 are not necessarily the same as the geographic footprint of each base station 50. Instead, each service area 48 in the illustration can be understood as the geographic region and/or network equipment zone or area that is associated with a given distributed cache 34. In one embodiment, there is one distributed cache 34 per cell or base station coverage area, but in other embodiments a given distributed cache 34 serves multiple base station cells or coverage areas. Broadly, however, the distributed caches 34 are pushed into and distributed within the RAN 46, to provide a relatively short inter-base-station or backhaul path between a given distributed cache 34 and the base station(s) 50 serving a given user device 12.

For simplicity of illustration and discussion, the RAN 46 is shown as having two service areas 48-1 and 48-2, with a first distributed cache 34-1 corresponding to the first service area 48-1 and a second distributed cache 34-2 corresponding to the second service area 48-2. Further, while the illustration only depicts one user device 12 in context with one user-specific cache 30 in the CDN 14, those skilled in the art will appreciate that the CDN 14 may include a large number of user-specific caches 30, each associated with a different user/subscriber. Correspondingly, the MCN 16 may support a large number of user devices 12, and provide caching services as taught herein for all such user devices 12, or at least for those user devices 12 that are associated with users that have subscribed for caching services via the MCN 16.

With the above in mind, FIG. 1 illustrates the depicted user device 12 in different locations at times "T1," "T2," and "T3." At time T1, the user device 12 receives content from the user-specific cache 30 via the PVR 28—e.g., via a Wi-Fi or other link to the PVR 28 and/or gateway 26 within the CDN 14. At some later time T2, the user device 12 has moved to the first service area 48 of the RAN 46 within the MCN 16 and it receives the same or other user-specific content from the distributed cache 34-1, via transmissions from a serving base station 50 within the first service area 48. At some time T3 subsequent to time T2, the user device 12 has moved from the first service area 48-1 into the second service area 48-2, and the user device 12 receives the same or other user-specific content from the distributed cache 34-2, via transmissions from a serving base station 50 within the second service area 48-2.

Figure 2:
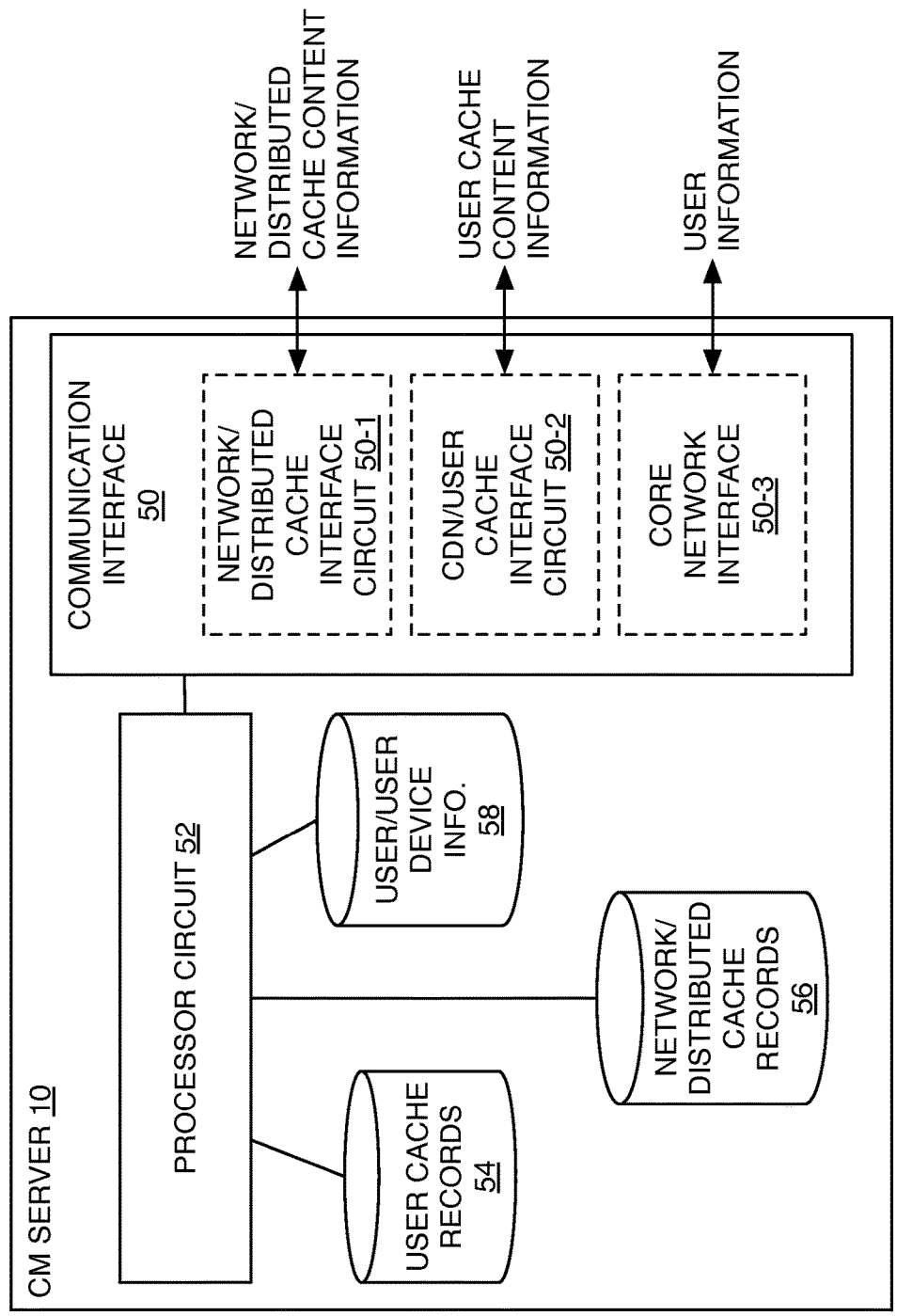
FIG. 2 is a block diagram of example details for the cache management server.

The cache management server 10 enables such caching operations based on being configured for caching content for delivery to the user device 12 via the MCN 16, where the MCN 16 has distributed caches 34 corresponding to different service areas 48 within the MCN 16. According to FIG. 2, in a non-limiting example configuration, the cache management server 10 includes a communication interface 50 that is configured to communicate with the distributed caches 34, and a processor circuit 52 that is operatively associated with the communication interface 50.

Here, the term "communication interface" denotes the physical and/or logical circuits and protocol stacks used for signaling and data between the cache management server 10 and external entities. As shown, the communication interface 50 may comprise plural interfaces, e.g., a network/distributed cache interface circuit 50-1 that is operative for communicating with the network cache 32 and/or the distributed caches 34, a CDN/user cache interface circuit 50-2 that is operative for communication with the user-specific caches 30 or other entities in the CDN 14 having knowledge of the particular contents in individual user caches 30, and a core network interface 50-3 that is configured for communicating with one or more entities in the CN 40 of the MCN 16.

Correspondingly, the processor circuit 52 uses the communication interface 50 to communicate with the network cache 32 and/or the distributed caches 34, and further to communicate with the individual user-specific caches 30, or with one or more other nodes or entities within the CDN 14 that have knowledge of the contents cached in the user-specific caches. Thus, for a given user, the cache management server 10 knows the content of the user-specific cache 30 affiliated with that user, and the cache management server 10 knows a detected or expected location for the user device 12 affiliated with the same user, and can therefore initiate distributed caching of the same content to the distributed cache(s) 34 that serve the service areas 48 of the MCN 16 corresponding to the expected or detected location.

One or more data stores—in memory, disk, or other non-volatile, computer-readable medium—hold such information for use by the processor circuit 52. The diagram, for example, illustrates user cache records 54, network/distributed cache records 56, and user/user device information 58. The user cache records 54, for example, include numeric, text, or other data identifying the contents of individual user-specific caches 30 within the CDN 14, where each user-specific cache 30 in general is associated with a different user who is a subscriber with respect to the CDN 14 and with respect to the MCN 16. The processor circuit 52 in one or more embodiments communicates with the CDN 14 to maintain the user cache records 54.

Alternatively, the CDN 14 may push data for the user cache records 54 to the cache management server 10, or to another node, which provides secure, authorized access to user-cache information by the cache management server 10.

In turn, the network/distributed cache records 56 describe the various contents that are cached at the network cache 56 and/or at individual ones of the distributed caches 34. Additionally, or alternatively, the network/distributed cache records 56 may indicate the state(s) of the network cache 32 and/or any one or more of the distributed caches 32 with respect to individual ones of the user-specific caches 30. For example, with respect to a given user/subscriber, the network/distributed cache records 56 may include flags or other indicators, indicating whether or not the network cache 32 and/or individual ones of the distributed caches 34 have the user's user-specific content available for delivery to the associated user device 12. Here, the "associated user device 12" will be understood to be the user device 12 known by the MCN 16 to be associated with the given user.

The network cache 32 and/or a given distributed cache 34 will be considered as containing a given user's user-specific content—i.e., the contents of the user-specific cache 30 corresponding to the given user—if the cache in question has a copy or copies of the same content as is stored in the user-specific cache 30, and if all needed permissions or digital rights management (DRM) keys or information are in place, to permit delivery of that content to the user device 12 of the user. Thus, a given cache (network or distributed) within the MCN 16 will be considered as having user-specific content for a given, particular user if that cache (1) actually has the correct content already cached and (2) if that already-cached content is actually available for authorized delivery to the particular user.

Finally, the user/user device information 58 comprises, for example: location information for the user device 58, caching services subscription information that indicates a level of caching services or priority to provide for each user/user device 12, and may include other information, such as DRM keys, device characteristics with respect to media playback, etc. As for the location information, such data may be dynamically updated based on positioning by the MCN 16 with respect to any number of user devices 12 for which caching services are provided. Real-time and near real-time positioning techniques are well known and any of a number of them may be used for one or more embodiments of the caching services contemplated herein. Such techniques include any one or more Global Positioning System (GPS) based positioning, with or without network assistance, Observed Time Difference of Arrival (OTDA) as performed at the user devices 12 and/or base stations 50, etc.

However, in at least some embodiments, the location information for a given wireless device 12 additionally or alternatively is based on expected location information. Thus, the user/user device information 58 may further or alternatively comprise data correlating different dates/times with different locations. Such information may be obtained, e.g., by having access to calendar information for the users. Additionally or alternatively, data of this type may be based on a running history of locations tracked for the user device 12 and may be particularly valuable when a given user/user device 12 moves around regularly according to a consistent, recurring schedule. In that case, the cache management server 10 may operate to provide that user with a high quality and consistent content delivery experience by ensuring that the user's user-specific content is pushed to those distributed caches 34 where the user (and his/her user device 12) is expected to be. The temporal window used for such cache management may be measured in terms of hours or even days, in dependence on the geographic scope of the user's movement, how often the user moves, how often the user's expected location matches the expected location, etc.

Thus, in some embodiments, the location detected or expected for a user device 12 is a detected location, and the processor circuit 52 is configured to detect the location from positioning information associated with the user device 12. In other embodiments, or at other times, the location detected or expected for the user device 12 is an expected location, and the processor circuit 52 is configured to determine the location according to stored associations relating different dates or times to different locations.

It will be appreciated that both techniques may be used at different times, or in combination. For example, content corresponding to a given user-specific cache 30 can be cached in one or more distributed caches 34 that correspond to expected locations of the corresponding user device 12, with additional caching performed with respect to the actual detected locations of the user device 12. Or, caching may be performed with respect to the actual, detected location of the user device 12, and also with respect to one or more distributed caches 34 that are in service areas 48 where the user device 12 is expected to be at some later time, based on direction of travel, tracked travel patterns, etc.

With these points in mind, the processor circuit 52 in one or more embodiments is configured to identify a first distributed cache 34-1 for a first service area 48-1 corresponding to a location detected or expected for the user device 12 and determine the content for caching in one or more of the distributed caches 34, based on content caching at a user-specific cache 30 belonging to a CDN 14 affiliated with a user of the user device 12. These processing steps may be performed together, or in a different order, and the processor circuit 52 is further configured to initiate caching of the content in the first distributed cache 34-1 for delivery to the user device 12 via the MCN 16, at least when the content is not available in the first distributed cache 34-1 for delivery to the user device 12.

In one embodiment, the processor 52 is configured to first determine whether or not the content in question is already available in the distributed cache 34 of interest, for delivery to the involved user device 12. Such processing may include verifying not only whether the proper content is already present in the distributed cache 34, but further verifying that the requisite permissions or other DRM information is in place, for delivering that content to the user device 12. In some embodiments, these conditions are fulfilled by copying out the actual content from the corresponding user-specific cache 30 into the network cache 32 and/or into the targeted distributed caches 34. In other embodiments, the conditions for making the content available for delivery to the user device 12 from the targeted distributed caches 34 are fulfilled by copying like content from another source (e.g., from a web server associated with the CDN 14), and then pushing any required permissions for the involved user device 12 to the targeted distributed caches 34.

Thus, in at least one embodiment, the processor circuit 52 is configured to initiate the caching of the content in the first distributed cache 34-1 for delivery to the user device 12 on a conditional basis, responsive to first determining that the content is not available in the first distributed cache 34-1 for delivery to the user device 12. In one or more other embodiments, the processor circuit 52 is configured to initiate the caching without first determining whether the content is already available in the targeted distributed cache(s) 34. The latter approach may be advantageous where bandwidth concerns on the sidehaul and/or backhaul links within the MCN 16 are minimal.

In at least one embodiment where the processor circuit 52 is configured to determine whether the content for a given user/user device 12 is already available in a targeted distributed cache 34, for delivery to the user device 12, the processor circuit 52 is configured to determine that the content is not available in the targeted distributed cache 34-1 for delivery to the user device 12 based on comparing first and second content records, i.e., comparing the user cache records 54 for the user-specific cache 30 with the network/distributed cache records 56 for the targeted distributed cache 34. As noted, the processor circuit 52 in one or more embodiments is configured to maintain those records, e.g., based on communicating through the communication interface 50.

Also as noted, in one or more embodiments, the processor circuit 52 is configured to determine that the content (for a given user/user device 12) is not available in any given one of the distributed caches 34-1 for delivery to the user device 12 by determining that the content is not present in the given distributed cache 34 and/or determining that digital rights management information needed for delivery of the content to the user device 12 is not present in the given distributed cache 34-1. Broadly, then, in one or more embodiments, the processor circuit 52 is configured to initiate the caching of the content in any given targeted one of the distributed caches 34 for delivery to a given user device 12, based on performing at least one of: initiating transfer of the content from the corresponding user-specific cache 30 or from the network cache 32 to the targeted distributed cache(s) 34, and initiating transfer of digital rights management information required for delivering the content from the distributed cache(s) 34 to the user device 12.

Further in at least some embodiments, the processor circuit 52 is configured to initiate the caching of the content in any targeted ones of the distributed caches 34 for delivery to a given user device 12, in advance of the user device 12 requesting the content through the MCN 16. For example, by determining the detected or expected location of a given user device 12, the cache management server 10 can initiate caching of user-specific content in the closest one(s) of the distributed caches 34, so that such content is available for delivery to the user device 12 at a high QoS, in advance of the user/user device 12 requesting such content.

It is also contemplated herein to identify the distributed cache(s) 34 to perform the disclosed caching operations with respect to the distributed cache 34 that corresponds to the service area 48 in which the user device's location is initially detected or expected, and then to dynamically update one or more of the neighboring distributed caches 34 with the user's content, based on tracking or predicting direction of movement, past movement patterns, etc. Such operations allows the user's content to always be cached and at the ready for delivery to the user's user device 12, from the closest one(s) of the distributed caches 34.

Thus, in at least one embodiment, the processor circuit 52 is configured to detect or predict movement of a user device 12 from a first service area 48-1 that is associated with a first distributed cache 34-1 to a second service area 48-2 that is associated with a second distributed cache 34-2, and to initiate caching of the content in the second distributed cache 34-2 for delivery to the user device 12. The processor circuit 52 performs such operations at least for the case where the content is not available in the second distributed cache 34-2 for delivery to the user device 12.

In the same or other embodiments, the processor circuit 52 is further configured to initiate delivery of a user-requested portion of a given user's content from any one of the distributed caches 34 to the corresponding user device 12 via the MCN 16. Further, in at least some embodiments, the cache management server 10 is configured to support continuation functions, where a given user begins consuming content through the CDN 14, e.g., directly through the user's PVR 28, and then continues consuming that content via the MCN 16. In such cases, the cache management server 10 may be configured to initiate caching of the user's content in the distributed cache 34 corresponding to the user's location, and to initiate resumption of content delivery to the user device 12.

Further, it is contemplated herein that the cache management server 10 provide additional cache management services with respect to the network cache 32 and/or the distributed caches 34. For example, the content corresponding to a particular user-specific cache 30 may be held within a given distributed cache 34 only for a limited period of time before it is marked for overwriting and/or deletion, e.g., where the content is cached in a distributed cache 34 corresponding to an expected location of the corresponding user device 12 but remains unused. The cache management server 10 in one or more embodiments also incorporates licensing restrictions, DRM controls, etc., to limit the number of cached copies of content that exist at any given time, to impose viewing restrictions, etc.

Still further, the cache management server 10 in one or more embodiments provides the contemplated cache management services on a selective basis, based on evaluating subscription information stored in the MCN 16. In this manner, the determination of content from user-specific caches and the initiating of caching that content in the distributed caches for delivery to corresponding user devices 12 is limited to those user devices 12 having users that are subscribers to the caching services.

Additionally, in at least some embodiments, if a user starts to access content that is not cached, that cache management server 10 initiates caching of the content in the distributed cache 34 corresponding to the service area 48 where the user is accessing the content. In at least one such embodiment, the cache management server 10 is also configured to initiate caching of that content in one or more other ones of the distributed caches 34, based on expected movement of the user within the playtime of the content the user has accessed. For example, if a user leaves home and starts streaming a recorded TV show, historical movement records may indicate that for the current date/time, it is expected that the user is traveling to work, and the cache management server 10 therefore initiates caching of the TV show in the distributed caches 34 corresponding to the path of travel between the user's residence and work location, or it may restrict such caching to just those distributed caches 34 for the service areas 34 that the user will be expected to transit in or through with respect to the playtime of the accessed content.

Figure 3:
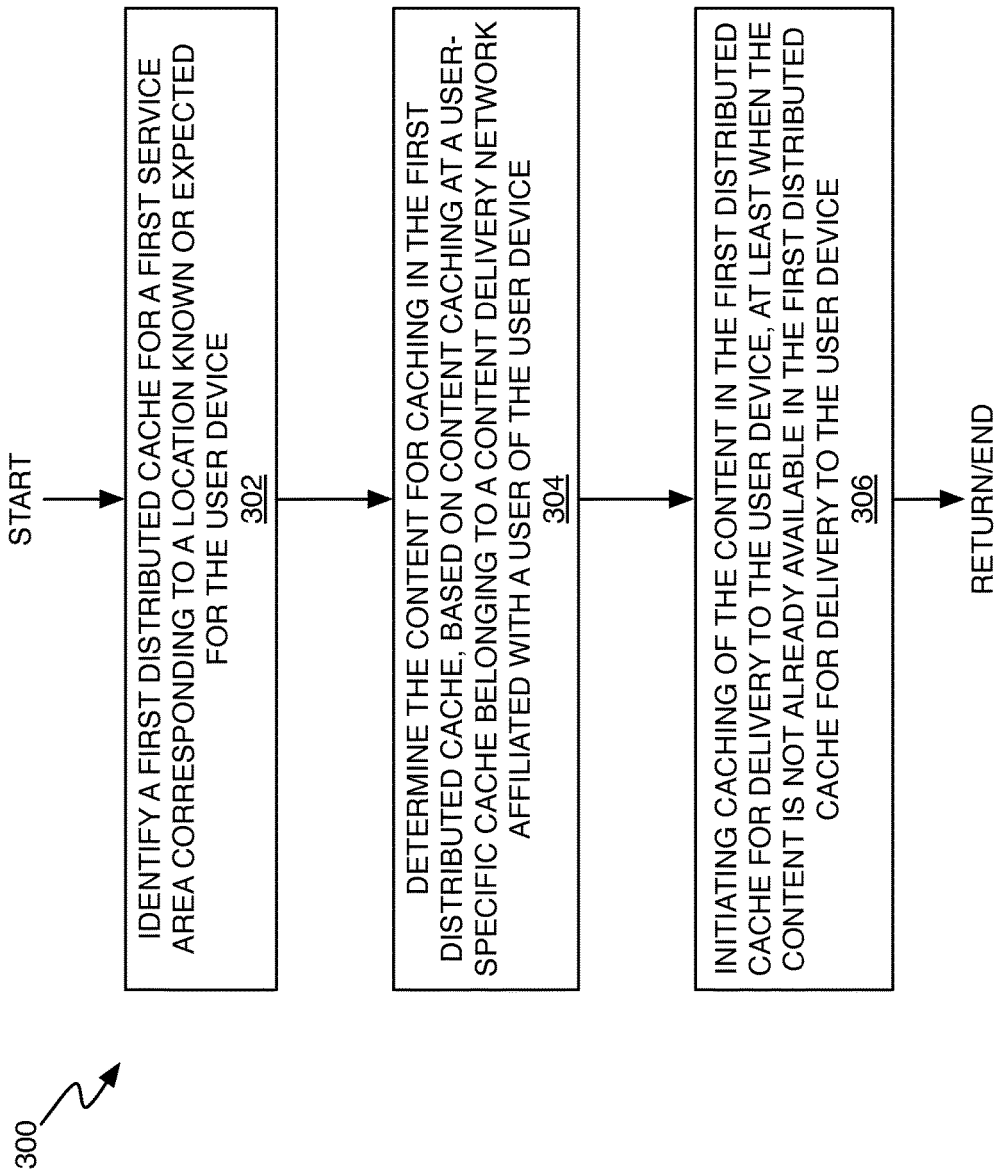
FIG. 3 is a logic flow diagram of one embodiment of a method of cache management processing, such as may be performed by the cache management server introduced in FIG. 1, for example.

FIG. 3 illustrates such caching services from a broad perspective and it will be understood that the contemplated cache management server 10 is configured to perform the operations comprising the method 300 shown in FIG. 3, based on fixed circuitry, programmatically configured circuitry, or some combination of both. In at least one embodiment, the cache management server 10, as suggested in FIG. 2, includes digital processing circuitry, such as one or more microprocessor-based circuits, along with supporting interface and memory circuits, as is known for computer systems configured to operate as "servers" in a network sense. Thus, in at least one embodiment, the cache management server 10 is configured to perform the method 300 based on the execution by the processor circuit 52 of computer program instructions stored in a computer-readable medium that is in or accessible to the cache management server 10.

It will also be appreciated that the processing operations depicted in the method 300 may be performed in an order different than that depicted, and that such operations may be performed with respect to any number of users—i.e., with respect to any number of user devices 12, user-specific caches 30, and distributed caches 34—and the relevant logic may be duplicated for multiple users and performed in parallel or serially. Further, the depicted operations may be performed on an ongoing basis, e.g., as background process, and/or as needed, on an event-driven basis, such as a triggered basis, e.g., responsive to detected user movements, content requests, etc. Finally, one or more of the depicted operations may be performed as part of a larger set of programmatic functions performed by the cache management server 10 within the MCN 16.

With the above qualifications in mind, the method 300 provides for the caching of content for delivery to a user device 12 via the MCN 16, which has distributed caches 34 corresponding to different service areas 48 within the MCN 16. The method 300 includes identifying (Block 302) a first distributed cache 34-1 for a first service area 48-1 corresponding to a location detected or expected for the user device 12, and determining (Block 304) the content for caching in the first distributed cache 34-1. The determination is based on content caching at a user-specific cache 30 belonging to the CDN 14 affiliated with a user of the user device 12. As such, the determination in one or more embodiments is based on the cache management server 10 knowing what is cached in the involved user-specific cache 30 and knowing what is cached in the first distributed cache 34. As noted, this determination process may be performed before the identifying step (Block 302) and/or may be performed on an ongoing, recurring, or as needed basis.

The method 300 continues initiating (Block 306) caching of the content in the first distributed cache (34-1) for delivery to the user device (12) via the mobile communication network (16), at least when the content is not already available in the first distributed cache (34-1) for delivery to the user device (12). In some embodiments at least, the initiating (Block 306) of the caching of the content in the first distributed cache 34-1 is performed on a conditional basis, responsive to a preceding step of determining that the content is not available in the first distributed cache 34-1 for delivery to the user device 12.

Figure 4:
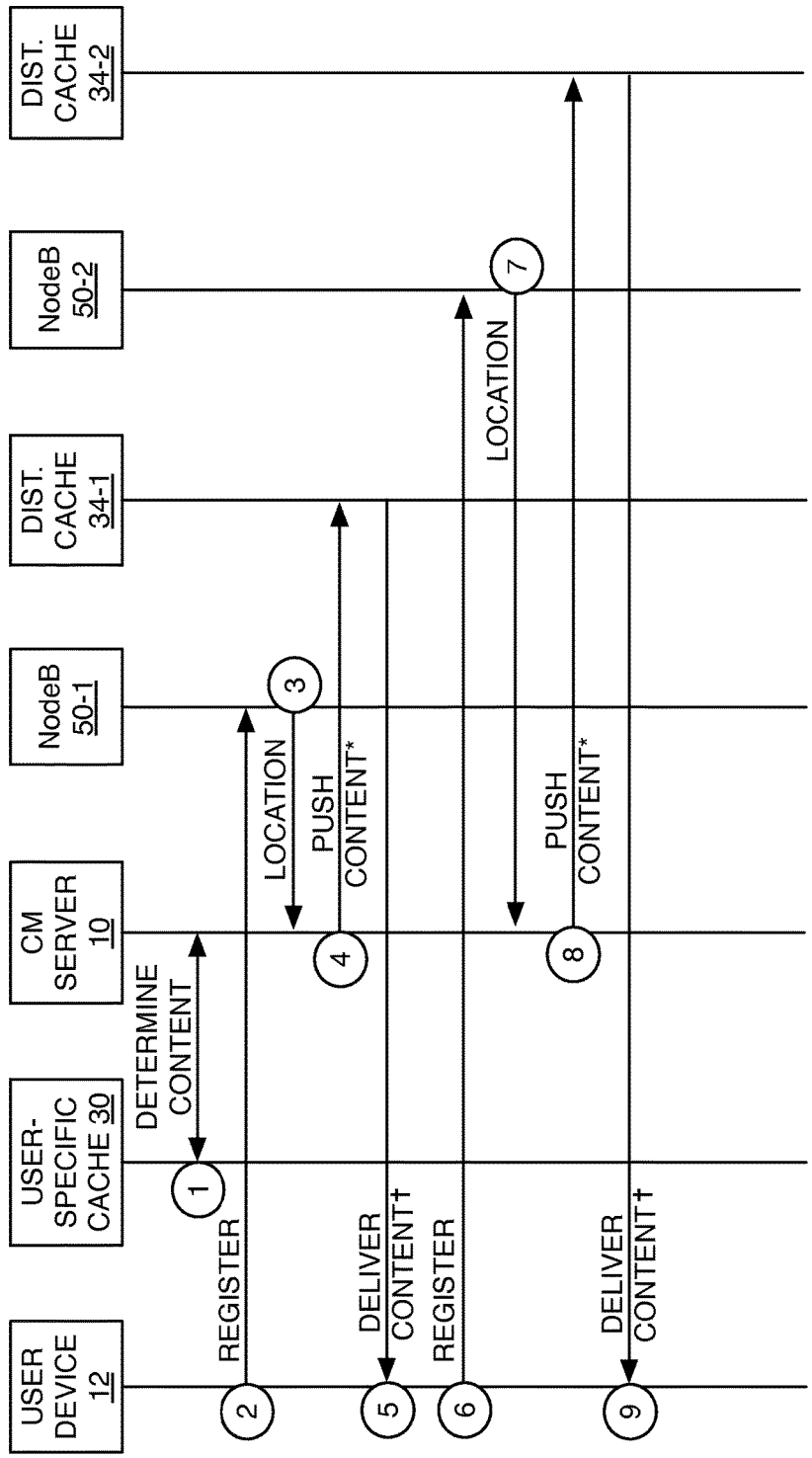
FIG. 4 is a signaling diagram illustrating one embodiment of cache management signaling contemplated herein, for an example case where a user device moves between first and second regions of a mobile communication network.

FIG. 4 illustrates an example signaling flow corresponding to the method 300, for the case where a user device 12 moves or initially registers in a first service area 48-1 associated with a distributed cache 34-1 and served by a base station 50-1, and where the user device 12 then moves to a second service area 48-2 that is associated with a distributed cache 34-2 and served by a base station 50-2. In one example where the MCN 16 is a Wideband Code Division Multiple Access (WCDMA) network, the base stations 50 are referred to as NodeBs". In a particular WCDMA embodiment, the MCN 16 is configured as a High-Speed Packet Access (HSPA) based network. Of course, those skilled in the art will appreciate that in different network architectures the base station nodes may have a different name. For instance, in an LTE embodiment of the MCN 16, the base stations 50 would be referred to as eNodeBs.

At Step 1, the cache management server 10 determines the content in the corresponding user-specific cache 30, either by directly communicating with the user-specific cache 30, or by communicating with another node in the CDN 14 having knowledge of the cache contents. At Step 2, the user device 12 performs a network registration through the base station 50-1, and a corresponding location indication is provided to the cache management server 10 at Step 3. Here, the location information may simply comprise a base station identifier and/or cell identifier, and the cache management server 10 may maintain a look-up table (LUT) or other data structure that maps base station or cell IDs to distributed caches 34. Further, it should be noted that the base station 50-1 may or may not communicate directly with the cache management server 10. For example, there may be one or more nodes within the CN 40 of the MCN 16 that provide the cache management server 10 with registration information indicating where within the RAN 46 a given user device 12 is currently registered.

The signaling flow continues at Step 4, where the cache management server 10 pushes the content for the user device 12 to the distributed cache 34-1, where "the content" in the context of this disclosure will be understood to be the user-specific content associated with the corresponding user-specific cache 30. As noted in the diagram, the push may be conditional, based on the cache management server 10 determining whether or not the content is already available in the distributed cache 34-1 for delivery to the user device 12.

The flow continues at Step 5, with delivery of the content from the distributed cache 34-1 to the user device 12. As with other aspects of the signaling flow diagram, the communications here are simplified in the sense that the content is delivered via the air interface between the base station 50-1 and the user device 12 and the actual content delivery thus flows through the base station 50-1. Also, as shown in the diagram, the content delivery may be a continuation of a prior content consumption session—e.g., the continuation of a paused movie, TV show, game, etc.—and the content delivery may be conditioned on receiving a content delivery request from the user device 12, such as where the user of the user device 12 resumes execution of a multi-media application running on the user device 12.

At Step 6, the user device 12 registers with the second base station 50-2 and this may happen on a handover basis from the base station 50-1 to the base station 50-2, where the handover may be an active-mode or idle mode handover. Or the user device 12 may disconnect from the MCN 16 and then later reconnect to the second base station 50-2. In any case, the cache management server 10 receives updated location information from/for the second base station 50-2 at Step 7 and at Step 8 pushes the content to the corresponding second distributed cache 34-2 in response. Again, the push may be conditional.

At Step 9, the cache management server 10 delivers the content from the second distributed cache 34-2 to the user device 12. The delivery also may be conditional, based on a content request, and "delivering content" in this sense and elsewhere herein can be understood as delivering a specific portion of the overall content, e.g., a user-requested portion, an in-progress portion, etc. Further, if the user device 12 is in active mode and is consuming content from the distributed cache 34-1 when it changes over from the base station 50-1 to the base station 50-2, the content delivery from the distributed cache 34-2 may be a continuation or resumption of the same content at the same point, as was being delivered from the distributed cache 34-1.

These and other aspects of operation guarantee that users enjoy a high quality content-viewing experience even while moving among different regions or service areas within the MCN 16. The content can be cached in several locations within the MCN 16, and when roaming occurs for a given user/user device 12, the cache locations can be dynamically updated to track actual or expected user movement. The cache management server 10 fulfills that role by being aware of the detected or expected locations of users/user devices 12, and by having knowledge of the different caching locations within the MCN 16.

The cache management server 10 is in charge of distributing the content for particular users to particular ones of the distributed caches 34, to provide those users with consistently high quality content delivery experiences. Such operations are based on user/subscriber profiles relating to the caching services, knowing user-specific cache contents, and knowing the correspondence between service areas 48 in the MCN 16 and the corresponding associated distributed caches 34. Advantageously, by pushing content for specific users to the distributed caches 34 that are closest to the detected or expected locations of those users, the cache management server 10 reduces overall bandwidth requirements in the MCN 16 for delivering such content, and provides faster, more consistent content delivery to the users.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of caching content for delivery to a user device via a mobile communication network having distributed caches corresponding to different service areas within the mobile communication network, said method comprising:
    identifying a first distributed cache for a first service area corresponding to a location detected or expected for the user device;
    determining the content for caching in the first distributed cache, based on content caching at a user-specific cache belonging to a content delivery network affiliated with a user of the user device; and
    initiating caching of the content in the first distributed cache for delivery to the user device via the mobile communication network at least when the content is not already available in the first distributed cache for delivery to the user device;
    wherein initiating the caching of the content in the first distributed cache is performed on a conditional basis, responsive to determining that the content is not available in the first distributed cache for delivery to the user device; and
    wherein determining that the content is not available in the first distributed cache for delivery to the user device comprises at least one of: determining that the content is not present in the first distributed cache, and determining that digital rights management information needed for delivery of the content to the user device is not present in the first distributed cache.

2. The method of claim 1, wherein determining that the content is not present in the first distributed cache for delivery to the user device is based on comparing a first content record for the user-specific cache with a second content record for the first distributed cache.

3. The method of claim 2, further comprising maintaining the first and second content records at a cache management server that is in the mobile communication network or associated therewith.

4. The method of claim 1, further comprising performing the step of initiating in advance of the user device requesting the content through the mobile communication network.

5. The method of claim 1, further comprising detecting or predicting movement of the user device from the first service area to a second service area that is associated with a second distributed cache, and initiating caching of the content in the second distributed cache for delivery to the user device, at least when the content is not already available in the second distributed cache for delivery to the user device.

6. The method of claim 1, further comprising initiating delivery of a user-requested portion of the content from the first distributed cache to the user device via the mobile communication network.

7. The method of claim 1, wherein the location detected or expected for the user device is a detected location determined from positioning information associated with the user device.

8. The method of claim 1, wherein the location detected or expected for the user device is an expected location determined according to stored associations relating different dates or times to different locations.

9. The method of claim 1, wherein initiating caching of the content in the first distributed cache for delivery to the user device comprises at least one of:
    initiating transfer of the content from the user-specific cache or a network cache to the first distributed cache; and
    initiating transfer of digital rights management information required for delivering the content from the distributed cache to the user device.

10. The method of claim 1, further comprising conditionally performing the method of claim 1 with respect to the user device, based on evaluating whether subscription information stored in the mobile communication network for the user indicates that the user is subscribed for caching services within the mobile communication network.

11. A cache management server configured for caching content for delivery to a user device via a mobile communication network having distributed caches corresponding to different service areas within the mobile communication network, said cache management server comprising:
    a communication interface configured to communicate with the distributed caches; and
    a processor circuit operatively associated with the communication interface and configured to:
        identify a first distributed cache for a first service area corresponding to a location detected or expected for the user device;
        determine the content for caching in one or more of the distributed caches based on content caching at a user-specific cache belonging to a content delivery network affiliated with a user of the user device; and
        initiate caching of the content in the first distributed cache for delivery to the user device via the mobile communication network, at least when the content is not available in the first distributed cache for delivery to the user device;
    wherein the processor circuit is configured to initiate the caching of the content in the first distributed cache for delivery to the user device on a conditional basis, responsive to determining that the content is not available in the first distributed cache for delivery to the user device; and
    wherein the processor circuit is configured to determine that the content is not available in the first distributed cache for delivery to the user device by at least one of:
        determining that the content is not present in the first distributed cache, and determining that digital rights management information needed for delivery of the content to the user device is not present in the first distributed cache.

12. The cache management server of claim 11, wherein the processor circuit is configured to determine that the content is not present in the first distributed cache for delivery to the user device based on comparing a first content record for the user-specific cache with a second content record for the first distributed cache.

13. The cache management server of claim 12, wherein the processor circuit is configured to maintain the first and second content records.

14. The cache management server of claim 11, wherein the processor circuit is configured to initiate the caching of the content in the first distributed cache for delivery to the user device, in advance of the user device requesting the content through the mobile communication network.

15. The cache management server of claim 11, wherein the processor circuit is configured to detect or predict movement of the user device from the first service area to a second service area that is associated with a second distributed cache, and to initiate caching of the content in the second distributed cache for delivery to the user device, at least for the case where it is determined that the content is not available in the second distributed cache for delivery to the user device.

16. The cache management server of claim 11, wherein the processor circuit is configured to initiate delivery of a user-requested portion of the content from the first distributed cache to the user device via the mobile communication network.

17. The cache management server of claim 11, wherein the location detected or expected for the user device is a detected location, and wherein the processor circuit is configured to detect the location from positioning information associated with the user device.

18. The cache management server of claim 11, wherein the location detected or expected for the user device is an expected location, and wherein the processor circuit is configured to determine the location according to stored associations relating different dates or times to different locations.

19. The cache management server of claim 11, wherein the processor circuit is configured to initiate the caching of the content in the first distributed cache for delivery to the user device, based on performing at least one of:
    initiating transfer of the content from the user-specific cache or from a network cache to the first distributed cache; and
    initiating transfer of digital rights management information required for delivering the content from the distributed cache to the user device.

20. The cache management server of claim 11, wherein the processing circuit is configured to conditionally perform the determine, identify and initiate operations set forth in claim 11 with respect to the user device, based on evaluating whether subscription information stored in the mobile communication network for the user indicates that the user is subscribed for caching services within the mobile communication network.

* * * * *